US012614920B2

(12) United States Patent
De Azevedo

(10) Patent No.: US 12,614,920 B2
(45) Date of Patent: Apr. 28, 2026

(54) UPS WITH PEAK-SHAVING AND ENERGY TIME SHIFTING FUNCTIONS SYSTEM

(71) Applicant: ON ENERGY STORAGE, INC., Miami, FL (US)

(72) Inventor: Ricardo De Azevedo, Miami, FL (US)

(73) Assignee: ON ENERGY STORAGE, INC., Miami, FL (US)

( * ) Notice: Subject to any disclaimer, the term of this patent is extended or adjusted under 35 U.S.C. 154(b) by 0 days.

(21) Appl. No.: 19/106,564

(22) PCT Filed: Sep. 1, 2023

(86) PCT No.: PCT/US2023/073304
§ 371 (c)(1),
(2) Date: Feb. 25, 2025

(87) PCT Pub. No.: WO2024/158439
PCT Pub. Date: Aug. 2, 2024

(65) Prior Publication Data
US 2025/0364832 A1 Nov. 27, 2025

Related U.S. Application Data

(60) Provisional application No. 63/374,377, filed on Sep. 2, 2022.

(51) Int. Cl.
*G06F 1/30* (2006.01)
*H02J 3/32* (2006.01)
(Continued)

(52) U.S. Cl.
CPC .............. *H02J 9/062* (2013.01); *H02J 3/32* (2013.01); *H02J 7/933* (2026.01); *H02J 2207/20* (2020.01)

(58) Field of Classification Search
CPC .......... H02J 9/062; H02J 3/32; H02J 7/00712; H02J 2207/20; H02J 3/38; H02J 7/00; H02J 9/06; G06F 1/30
(Continued)

(56) References Cited

U.S. PATENT DOCUMENTS 11,289,940 B2 * 3/2022 Giuntini .................... H02J 9/04
2004/0044442 A1 3/2004 Bayoumi et al.
(Continued)

FOREIGN PATENT DOCUMENTS

AU 2016200827 A1 8/2017
WO WO-2024158439 A1 8/2024

OTHER PUBLICATIONS

PCT/US2023/073304 International Preliminary Report on Patentability dated Mar. 1, 2025.
(Continued)

*Primary Examiner* — Rexford N Barnie
*Assistant Examiner* — Xuan Ly
(74) *Attorney, Agent, or Firm* — WILSON SONSINI GOODRICH & ROSATI

(57) ABSTRACT
The current invention relates to an uninterruptible power supply (UPS) with PeakShaving and energy time shifting functions system comprising at least one UPS comprising an AC/DC conversion stage, a DC/AC conversion stage, and at least one Energy Storage System (ESS); an Energy Management System (EMS) configured to control the system: at least one processor, and at least one non-transitory computer readable media comprising software; wherein the software causes the processor to configure the system to operate according to different operating stages.

34 Claims, 15 Drawing Sheets

(51) Int. Cl.

| | |
|---|---|
| *H02J 3/38* | (2026.01) |
| *H02J 7/00* | (2026.01) |
| *H02J 9/06* | (2006.01) |
| *H02J 7/90* | (2026.01) |

(58) Field of Classification Search
USPC ........................................................ 307/23
See application file for complete search history.

(56) References Cited

U.S. PATENT DOCUMENTS

| | | | |
|---|---|---|---|
| 2006/0267411 | A1 | 11/2006 | Farmer |
| 2008/0114499 | A1 | 5/2008 | Hakim et al. |
| 2011/0006737 | A1 | 1/2011 | Saligram et al. |
| 2014/0039965 | A1 | 2/2014 | Steven et al. |
| 2014/0352231 | A1 | 12/2014 | Crosby, Jr. |
| 2014/0368043 | A1 | 12/2014 | Colombi et al. |
| 2015/0171666 | A1 | 6/2015 | Yeon et al. |
| 2016/0329707 | A1 | 11/2016 | Carlson et al. |
| 2018/0269685 | A1* | 9/2018 | Sugeno ................... H02S 40/32 |
| 2019/0044370 | A1 | 2/2019 | Mondal |
| 2023/0178982 | A1 | 6/2023 | Ortiz et al. |
| 2024/0419230 | A1 | 12/2024 | Archer et al. |
| 2025/0118962 | A1* | 4/2025 | Richmond .............. H02J 3/001 |
| 2025/0343419 | A1 | 11/2025 | Mondal |

OTHER PUBLICATIONS

Yuzhuo, Li, and Yunwei Li. AI Load Dynamics- A Power Electronics Perspective. arXiv preprint arXiv:2502.01647:1-15 (2025).
Sidewalk Infrastructure Partners. Data Center Flexibility: A Call to Action. pp. 1-6. (2024).
U.S. Appl. No. 19/395,878 Office Action dated Jan. 14, 2026.

\* cited by examiner

UPS WITH PEAK-SHAVING AND ENERGY TIME SHIFTING FUNCTIONS SYSTEM

CROSS-REFERENCE TO RELATED APPLICATIONS

This application is a U.S. National Stage patent application of International Patent Application No. PCT/US2023/073304 filed on Sep. 1, 2023, which claims the benefit of U.S. Provisional Patent Application No. 63/374,377 filed on Sep. 2, 2022, each of which is hereby incorporated by reference herein in its entirety.

FIELD OF THE INVENTION

The current invention is related to Uninterruptible Power Supply (UPS) devices and Energy Storage Systems (ESS), and more particularly it is related to a system combining UPS with Peak-Shaving and Energy Time Shifting Functions.

BACKGROUND OF THE INVENTION

An Uninterruptible Power Supply (UPS) is a device that uses some sort of energy storage (ES—typically electrochemical batteries) to assure continuous high-quality electrical supply to a critical load. It does this by using the ES as a buffer between the main electrical supply (be it the grid or some electrical source such as a generator) and the load, via power electronics converters that take the Alternating Current (AC) from the main supply and transform it to Direct Current (DC) of the battery (this converter is called a rectifier) and vice-versa from the DC bus to the AC load (this converter is called an inverter). As shown in FIG. 1, the power flow of this type of solution is always one-way, from the grid or supply to the battery or ES, and finally to the load. This electrical arrangement is defined as "in series", all energy flows through the UPS to the load; these systems are also referred to as double-conversion and offer the most protection. Although this conversion inevitably creates inefficiencies and a slight loss of energy, it is done because it shields the load from any issue in the main electrical supply, like voltage and frequency fluctuations, harmonics, outages, and other power quality issues. These systems also usually have a Static Switch Bypass (SSB) that allows the energy to flow directly through an alternate circuit that reduces losses but has a slightly slower response time to power quality events (FIG. 2).

Typically, UPS systems use a short-duration battery or ES to protect loads from brief power interruptions or fluctuations—which are the most common power quality issues. However, in some utility grids and off-grid electrical systems the supply might be less robust and reliable, leading to more and longer power quality events. For industries, businesses, and other critical loads such as hospitals, police and fire stations, military facilities and such, these interruptions can cause serious economic, operational, and even human damage. Longer duration UPS using Energy Storage Systems (ESS) such as lithium-based battery arrangements can be a solution for these problems (FIG. 3). However, such systems sometimes become prohibitively expensive because the ESS represents most of the cost of the UPS system as the energy (or backup duration) requirements increase.

Typical UPS systems maintain the ES at 100% State of Charge (SOC) to have the maximum duration for any power quality event. When it is in backup mode it discharges the ES, but once it reconnects to the power supply it automatically recharges the ES to be ready for the next event.

On the other hand, typical ESS systems use bidirectional Power Conversion Systems (PCS) that can charge and discharge the battery or ES (FIG. 4). This electrical arrangement is defined as "in parallel" because the energy from the supply to the load doesn't flow through the ESS, but this solution cannot shield the load from instantaneous or very quick power quality fluctuations. However, this architecture does allow for the ESS to charge and discharge the ES device at different times to seek efficiencies in the billing of the consumer. For example, the ESS can reduce peaks of consumption (Peak-Shaving) or demand/power charges that are calculated at certain times of the day. Additionally, it can time shift energy from cheaper rates (or excessive on-site renewable energy production) to times when the electric rates are most expensive (also known as Time of Use rates—TOU or load shifting). Additionally, this scheme can even inject energy back into the grid, if necessary, although most utilities prohibit this, or it isn't economically optimal to do so with the battery when net metering rates are in place (unless there is a more beneficial rate at which net metering is considered at different times of the day).

Typical Energy Storage System (ESS) solutions are an aggregation of several sub-systems. The total ESS capacity is split up into one or several racks, each controlled by a Cluster Management System (CMS) and made up of several battery modules connected in series. Each module is monitored by a Battery Management Unit (BMU) and in turn is composed of several cells connected in series. Each of these cells has a voltage and temperature sensor, and the BMU and CMS feed this data into the top-level Battery Management System (BMS) that in turn connects to an Energy Management System (EMS).

The fundamental problem of industrial customers with sensitive loads, is that they require a power supply that provides uninterrupted operation and conditioning of the grid. The use of a UPS system solves this problem by offering a backup source as well as a system that filters variations in the grid, such as spikes, electrical noise, and harmonics. In addition, with the increase in energy demand, the creation of new regulations and the increase in electricity rates, consumers are looking to optimize their energy use and reduce their bills. An ESS provides a perfect solution in many cases, in Peak-Shaving operation mode the system discharges stored energy at specific times where demand charges are billed, which usually also corresponds with higher rates, and charges at lower rates, reducing bills and the carbon footprint of industries.

However, due to the complexity in the communication, synchronization, and control of these two systems, there is a need for a solution capable of integrating the elements that make up each system, and to control the sub-systems offering backup, Peak-Shaving and time shifting services at the same time.

BRIEF DESCRIPTION OF THE INVENTION

The current invention relates to an uninterruptible power supply (UPS) with Peak-Shaving and energy time shifting functions system comprising at least one UPS comprising an AC/DC conversion stage, a DC/AC conversion stage, and at least one Energy Storage System (ESS); an Energy Management System (EMS) configured to control the system; at least one processor, and at least one non-transitory computer readable media comprising software; wherein the software causes the processor to configure the system to operate according to different operating stages.

In a first embodiment of the invention, the first stage is a charge stage, wherein the system is configured to perform the steps of powering the load by a power source, keeping the ESS fully charged and providing a back-to-back UPS operation; there is also a discharge stage, wherein upon detection of predetermined power quality events or when there are higher rates or power demand/capacity charges, the system is configured to perform the steps of reducing or preventing drawing power from the power source and instead, drawing power from the ESS.

Another stages are a recharge stage, wherein the system is configured to perform the steps of re-enabling the AC/DC conversion stage to 100% or somewhere in between to control the charging of the ESS depending on the available charge thereof to and maintaining the ESS upon an established threshold; and finally, a stand-by stage, wherein the system is configured to perform the steps of drawing an amount of current from the power source that is exactly equal to the amount of current needed by the load, preventing charge or discharge of the ESS.

In an embodiment of the invention, the AC/DC conversion stage is performed by a rectifier and the DC/AC conversion stage is performed by an inverter.

In another embodiment of the invention the at least one Energy Storage System (ESS) has a respective DC/DC converter. In this embodiment, the system achieves its function by controlling the rectifier or the DC/DC converter, for example, the step of reducing or preventing drawing power from the power source and instead, drawing power from the ESS is performed by limiting the rectifier or controlling the DC/DC converter.

In another embodiment of the invention the AC/DC conversion stage is performed by Power Conversion Systems (PCS), and the DC/AC conversion stage is performed by Power Conversion Systems (PCS).

Another aspect of the invention considers a computer software that comprises instructions to operate a UPS with Peak-Shaving and energy time shifting functions system according to the aforementioned stages and the corresponding steps of the methods related to the operation of each stage.

Another aspect of the invention considers a non-transitory computer readable media that comprises a software or executable instructions to configure the system according to the aforementioned stages and the corresponding steps of the methods related to the operation of each stage.

The novel aspects of the invention, as well as the operation and advantages thereof will be better understood from the figures and the detailed description of the invention.

BRIEF DESCRIPTION OF THE DRAWINGS

Novel aspects considered characteristic of the current invention will be established particularly in the claims section. However, some embodiments, characteristics and some objects and advantages thereof will be better understood from the detailed description, when read related to the drawings, wherein:

DETAILED DESCRIPTION OF THE INVENTION

Figure 1:
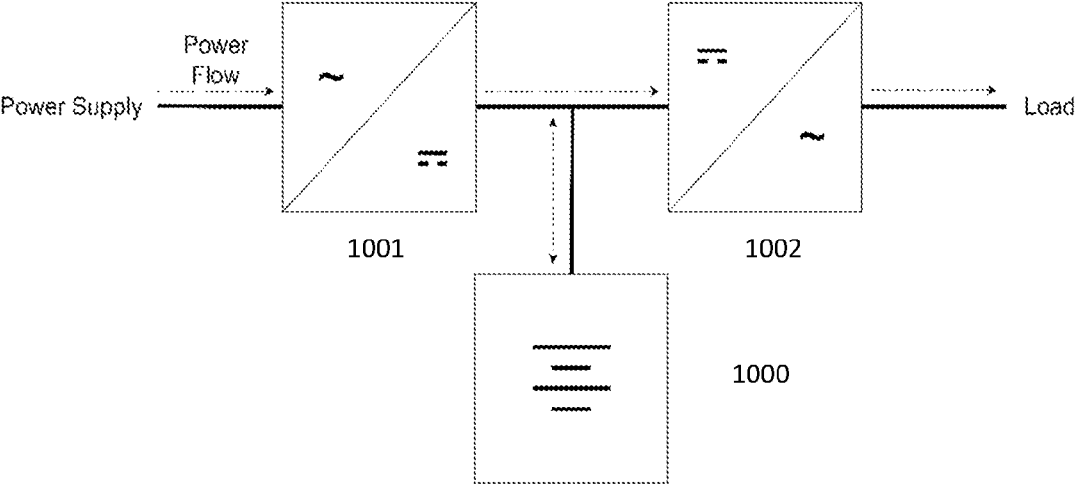
FIG. 1 represents a typical UPS topology.

During the development of the current invention, it has been found that the proposed invention is a combined hardware and software package consisting of an EMS. The system allows dynamic control of the power supplied by the power source to the load and ESS. Conventional systems have two operating states: on-grid and off-grid, which translates into the delivery of 100% or 0% of the energy required by the load by the ES. However, with the integration of a UPS and ESS system enabled by the smart control and optimization of the present invention, the options of Peak-Shaving, load-shifting and other advanced energy management strategies are enabled. The power consumption from the power source can now be dynamic in a range of 0-100%, based on the load requirements, as well as the cost of energy (TOU).

Thus, in one aspect of the current invention, it is described an uninterruptible power supply (UPS) with Peak-Shaving and energy time shifting functions system comprising at least one UPS comprising a rectifier, an inverter, and at least one Energy Storage System (ESS); an Energy Management System (EMS) configured to control the system; at least one processor; and at least one non-transitory computer readable media comprising software; wherein the software causes the processor to configure the system to operate according to the following stages:

A charge stage, wherein the system is configured to perform the steps of powering the load by a power source, keeping the ESS fully charged and providing a back-to-back UPS operation.

A discharge stage, wherein upon detection of power quality events or when there are higher rates or power demand/capacity charges, the system is configured to perform the steps of limiting the rectifier to reduce or prevent drawing power from the power source and instead, drawing power from the ESS discharging the ESS.

A recharge stage, wherein the system is configured to perform the steps of re-enabling the rectifier to 100% or somewhere in between to control the charging current to the ESS depending on the available charge thereof and maintaining the ESS upon an established threshold; and A stand-by stage, wherein the system is configured to perform the steps of commanding the rectifier in real-time, drawing an amount of current from the power source exactly equal to the amount of current needed by the load, preventing the charge or discharge of the ESS.

In a preferred embodiment of the current invention, at least one Energy Storage System (ESS) has a respective DC/DC converter; wherein in the system operates according to the following stages:

a charge stage, wherein the system is configured to perform the steps of powering the load by a power source, keeping the ESS fully charged and providing a back-to-back UPS operation;

a discharge stage, wherein, upon detection of predetermined power quality events or upon detection of higher rates or power demand/capacity fees, the system is configured to perform the steps of drawing power from the ESS by controlling the DC/DC converter and/or the rectifier to reduce or prevent drawing power from the power source.

a recharge stage, wherein the system is configured to perform the steps of configuring the DC/DC converter and/or the rectifier, to control the charging current to the ESS depending on the available charge thereof and maintaining the ESS upon an established threshold; and a stand-by stage, wherein the system is configured to perform the steps of commanding the rectifier or the DC/DC converter and/or the rectifier in real-time, drawing an amount of current from the power source exactly equal to the amount of current needed by the load, preventing the charge or discharge of the ESS.

In a different embodiment of the current invention the system has a double-conversion configuration.

In another embodiment of the current invention the EMS is connected directly to the rectifier through a dedicated communication port.

In another embodiment of the current invention the EMS is configured to receive a signal causing the rectifier to limit the power consumption from the power source.

In a preferred embodiment, the signal is sent by a closed-loop control algorithm to adjust the signal based on the desired battery power output and the dynamic load power.

In another embodiment of the current invention, the EMS additionally maintains communication with all the elements of the UPS with Peak-Shaving and energy time shifting functions system through industrial communication protocols to obtain a status and control each element and to avoid overloads or excessive discharges of the ESS system.

In another preferred embodiment of the invention it is described an uninterruptible power supply (UPS) with Peak-Shaving and energy time shifting functions system comprising at least one UPS comprising at least one Power Conversion System (PCS), and at least one Energy Storage System (ESS); an Energy Management System (EMS) configured to control the system; at least one processor; and at least one non-transitory computer readable media comprising software; wherein the software causes the processor to configure the system to operate according to the following stages:

A charge stage, wherein the system is configured to perform the steps of powering the load by a power source, keeping the ESS fully charged and providing a back-to-back UPS operation.

A discharge stage, wherein upon detection of power quality events or when there are higher rates or power demand/capacity charges, the system is configured to perform the steps of limiting the at least one PCS to reduce or prevent drawing power from the power source and instead, drawing power from the ESS discharging the ESS.

A recharge stage, wherein the system is configured to perform the steps of re-enabling the at least one PCS to 100% or somewhere in between to control the charging current to the ESS depending on the available charge thereof and maintaining the ESS upon an established threshold; and A stand-by stage, wherein the system is configured to perform the steps of commanding the at least one PCS in real-time, drawing an amount of current from the power source exactly equal to the amount of current needed by the load, preventing the charge or discharge of the ESS.

Figure 15:
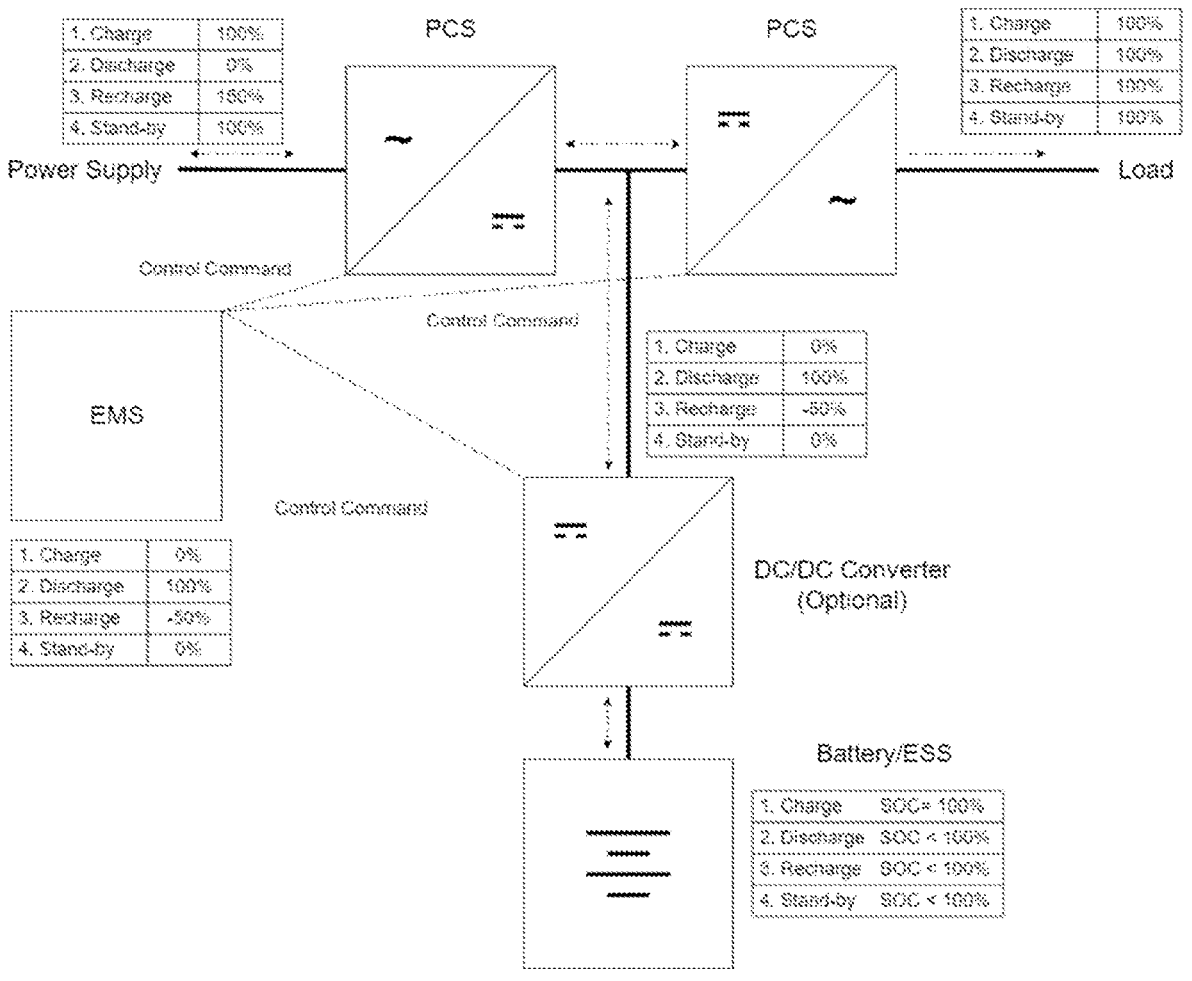
FIG. 15 represents a UPS+Peak-Shaving operation in which PCS units are used in the rectifier and inverter and the DC/DC converter is optional.

In a different embodiment of the current invention the system has a double-conversion configuration, and a DC/DC converter is provided, this embodiment is shown in FIG. 15.

In another embodiment of the current invention the EMS is connected directly to the at least one PCS through a dedicated communication port.

In another embodiment of the current invention the EMS is configured to receive a signal causing the at least one PCS to limit the power consumption from the power source.

In a preferred embodiment, the signal is sent by a closed-loop control algorithm to adjust the signal based on the desired battery power output and the dynamic load power.

In another embodiment of the current invention, the EMS additionally maintains communication with all the elements of the UPS with Peak-Shaving and energy time shifting functions system through industrial communication protocols to obtain a status and control each element and to avoid overloads or excessive discharges of the ESS system.

In another aspect of the current invention, it is described a method to operate a UPS with Peak-Shaving and energy time shifting functions system comprising the following steps:

configuring the system to a charge stage, by performing the steps of powering the load by the power source, and keeping the ESS fully charged to achieve a back-to-back UPS operation;

configuring the system to a discharge stage, by performing the steps of reducing or preventing drawing power from the power source and instead drawing power from the ESS remaining upon an established threshold of rates or power demand or capacity;

configuring the system to a recharge stage, by performing the steps of re-enabling the AC/DC conversion stage to 100% or somewhere in between to control the charging of the ESS depending on the available charge thereof maintaining the ESS upon an established threshold; and configuring the system to a stand-by stage, by performing the steps of drawing an amount of current from the power source that is exactly equal to the current needed by the load, no more and no less, preventing charge or discharge of the ESS.

In an embodiment of the current invention, the discharge stage further comprises that the AC/DC conversion stage is already online and starts drawing current from the ES to feed the load, so the load sees no disturbance whatsoever.

In another embodiment of the current invention, the discharge stage further comprises shutting off the AC/DC conversion stage, either directly or by simulating an outage through an external breaker to achieve a power draw of 100% or 0%.

In another embodiment of the current invention, the discharge stage further comprises monitoring in real-time the ES (modules and cells) through the BMU, CMS and BMS, and shutdown the DC/AC conversion stage when the minimum cell voltage of any of the racks reaches its minimum allowable level.

In another embodiment of the current invention, the recharge stage further comprises supplying 100% of the load plus any current to the ES at a preset charging rate with the AC/DC conversion stage, depending on maximum ratings of each device and any limitations the power supply might have.

In another embodiment of the current invention, the recharge stage further comprises controlling the AC/DC conversion stage to stop the power inflow to the ES when the maximum cell voltage of any of the racks reaches its maximum allowable level.

In an embodiment of the current invention the AC/DC conversion stage input signal is a power setpoint that limits the throughput.

In an embodiment of the current invention the error (E) between the expected battery output (Battery Setpoint— $B_{SP}$) and the actual battery output (Battery Measurement— $B_M$) is the input to the controller, wherein it is multiplied by a proportional gain factor ($K_P$) and added to the previous control output (Ct-1). This is the output of the controller and input to the rectifier as shown on the following Formulae:

$$C(t) = C(t-1) - (B_{SP} - B_M) * K_P$$

$$C(t) = C(t-1) - E * K_P$$

In another embodiment of the current invention the current throughput is restricted from 0 to 100% of its capacity by an electrical signal.

In another aspect of the current invention, it is described a software that comprises instructions to operate a UPS with Peak-Shaving and energy time shifting functions system according to the aforementioned stages and the corresponding steps of the methods related to the operation of each stage.

In another aspect of the current invention, it is described a non-transitory computer readable media that comprises a software or executable instructions to configure the system according to the aforementioned stages and the corresponding steps of the methods related to the operation of each stage.

The performance of the present invention in its different modes of operation is based on a processor configured to define operating stages of the system based on predetermined power quality events, the electrical and market information available at the moment. The EMS controls the activation of the operating modes considering the location of the equipment, since it depends on the electrical locale regulatory standards. The present invention is configured to operate under the electric standards of each country. In addition, if there are operators or aggregators of the electrical service, the EMS takes into account the information generated by them. Thus, the present invention is capable of self-configuration based on live electricity market prices, electricity demand in real time, electric rates (TOU). The software and configuration of the system can be performed on a cloud-based control, or completely isolated according to pre-set parameters.

In the case of Peak-Shaving, the present invention is highly dependent on the schedules established by the electricity regulator, which establishes the rates and schedules for energy prices, which allows the system to extract energy from the ESS when high rates are being applied and recharging the ESS when lower rates are applicable. Therefore, as the system is self-configuring, it has the capacity to adapt to changes and operate in different modes depending on the case and the operating context, without neglecting the a priori preferences established by the client.

Referring now to FIG. 1 it represents a typical UPS topology, that is, an electrical arrangement of one rectifier 1001, one inverter 1002 and one battery 1000, wherein all energy flows through the UPS to the load.

Figure 2:
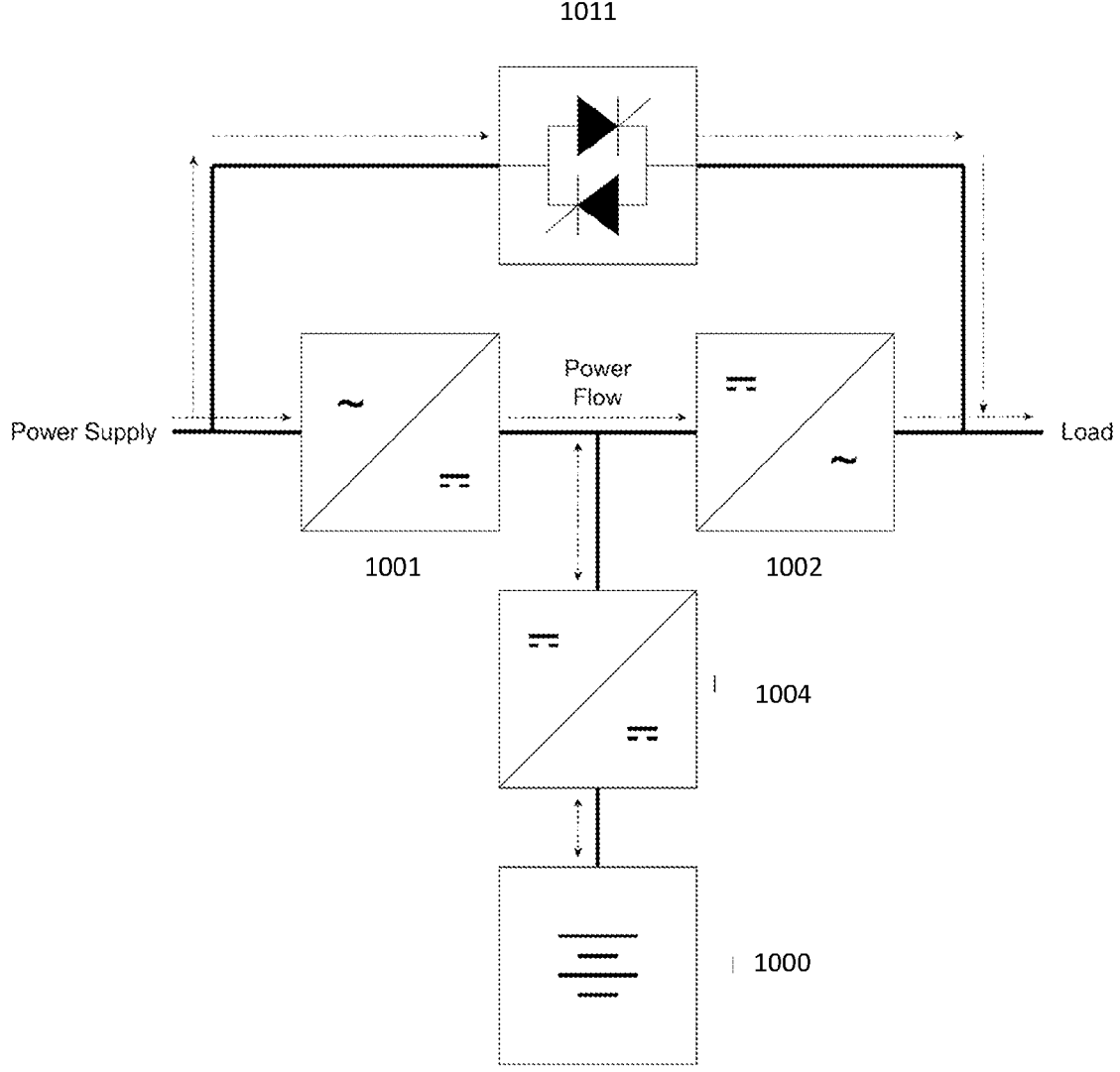
FIG. 2 represents a typical UPS topology with static switch bypass.

Referring now to FIG. 2 it represents a typical UPS topology with one rectifier 1001, one inverter 1002, one battery 1000, one DC/DC Converter 1004 and a Static Switch Bypass (SSB) 1011, wherein alternatively all energy can flow through the SSB to the load.

Figure 3:
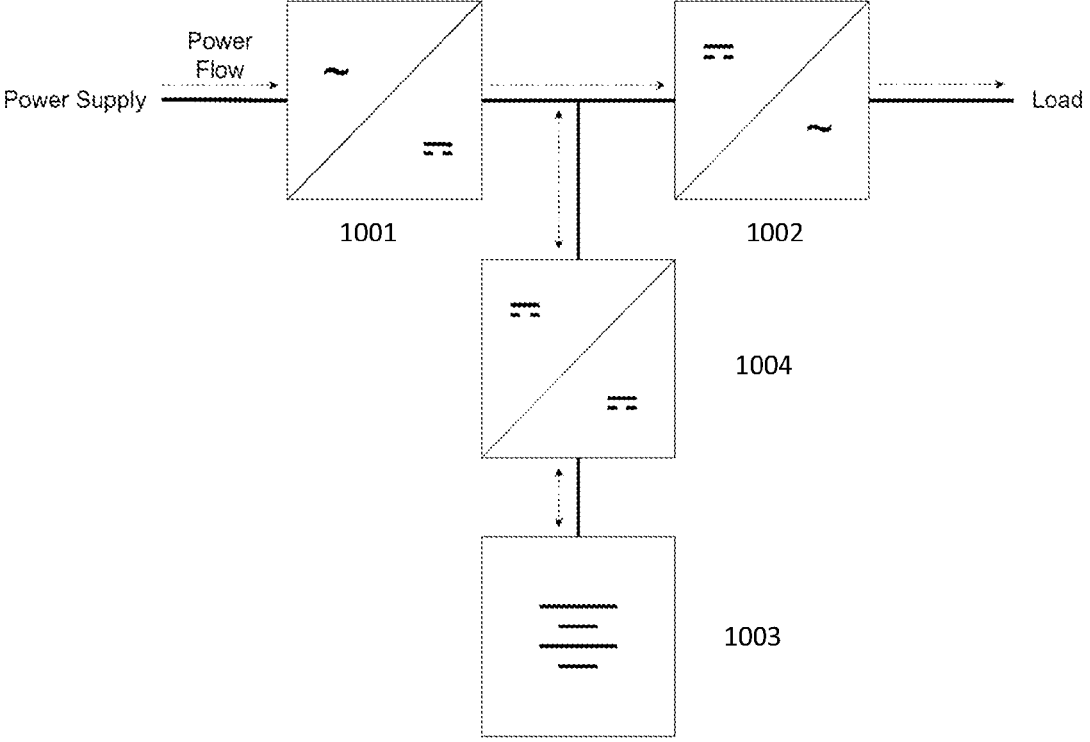
FIG. 3 represents a typical UPS+ESS topology.

Referring now to FIG. 3 it represents a typical UPS+ESS Topology, comprising one rectifier 1001, one inverter 1002, one DC/DC Converter 1004, and one ESS 1003.

Figure 4:
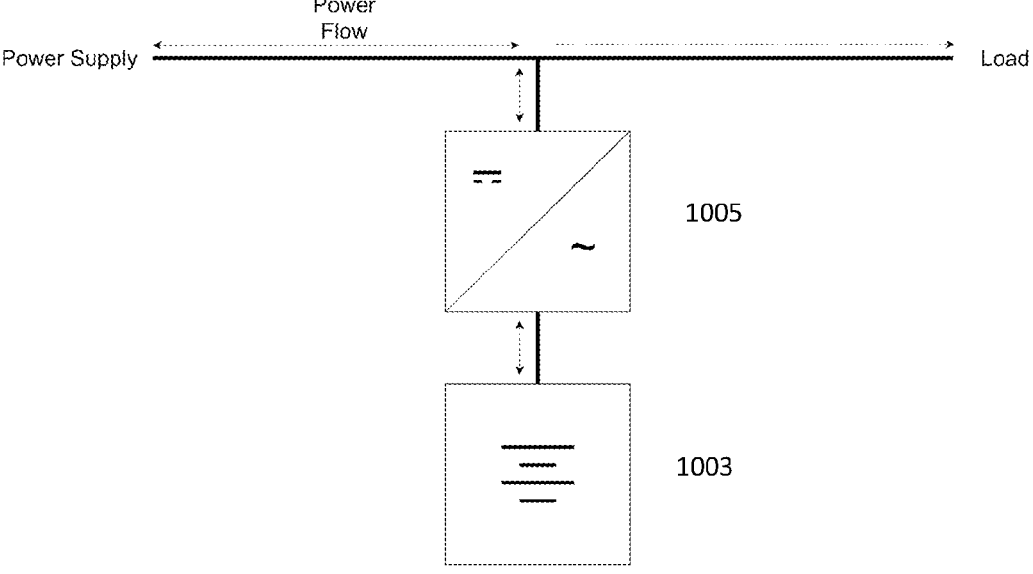
FIG. 4 represents typical ESS topology.

Referring now to FIG. 4 it represents a typical ESS topology, comprising one Bidirectional Power conversion System 1005, and one ESS 1003.

Figure 5:
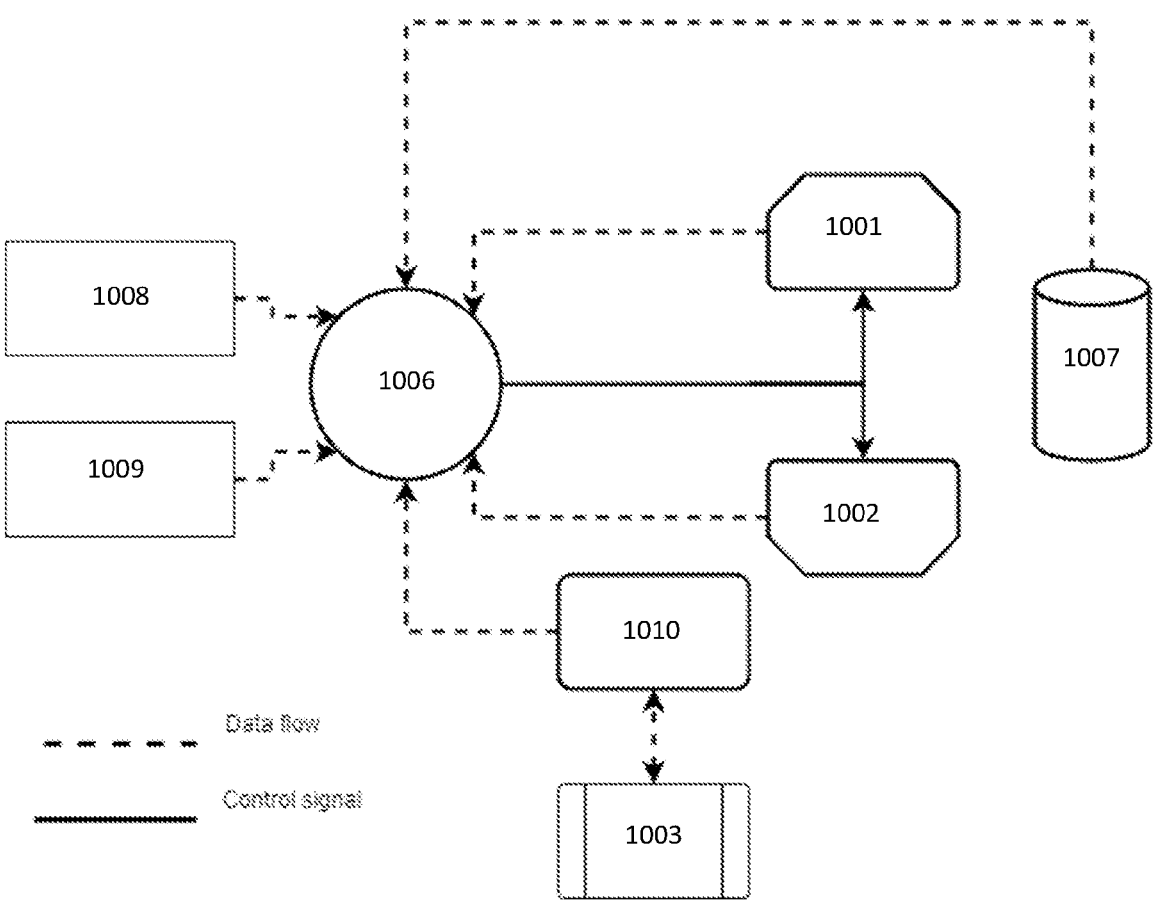
FIG. 5 represents a flow diagram for reading information, making decisions and responses through control signals in accordance with an embodiment of the current invention.

Referring now to FIG. 5 it represents a flow diagram for reading information, making decisions and responses through control signals wherein the EMS 1006 receives information from the load 1007, external parameters (the regulatory standards, the electric rates, the power source condition) 1008, the customer requirements 1009, the battery management system (BMS) 1010, which receives information from the ESS 1003, the inverter 1002 and the rectifier 1001, and then, in accordance with the claimed method the EMS 1006 controls the inverter 1002 and the rectifier 1001.

Figure 6:
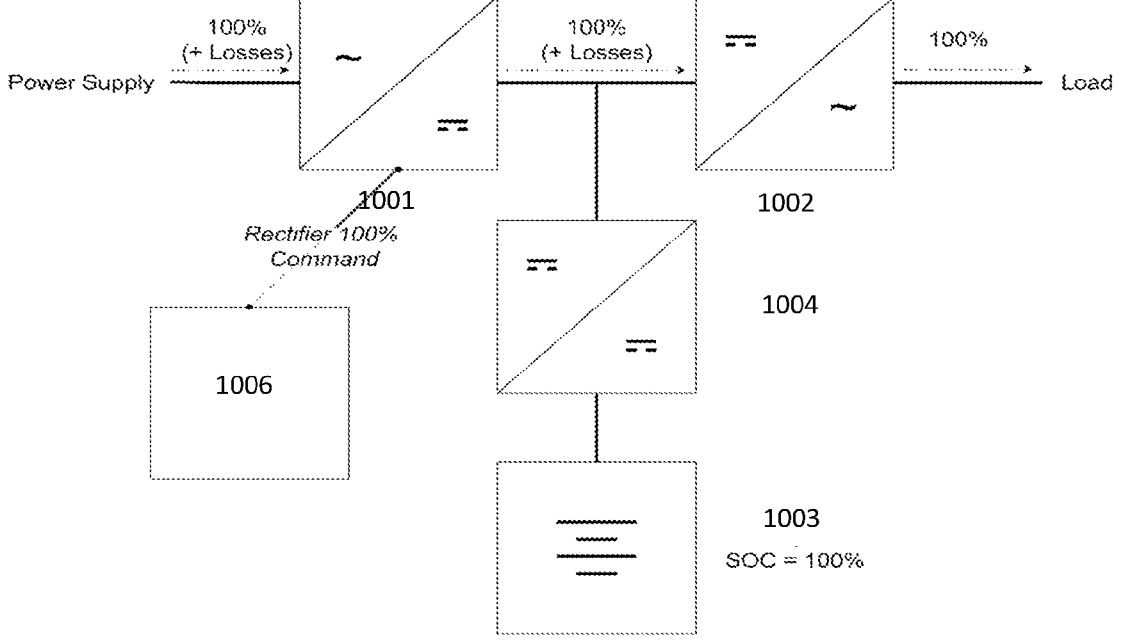
FIG. 6 represents a UPS+Peak-Shaving Typical Operation in accordance with the charge stage of the current invention.

FIG. 6 represents UPS+Peak-Shaving Typical Operation in accordance with the current invention wherein the rectifier 1001 receives the total load from the power supply and sends information to the EMS 1006 which analyses the information and performs the claimed method. Then, the load goes to the DC/DC Converter 1004, and one ESS 1003, and then back to the inverter 1002, in order to supply the total load.

Figure 7:
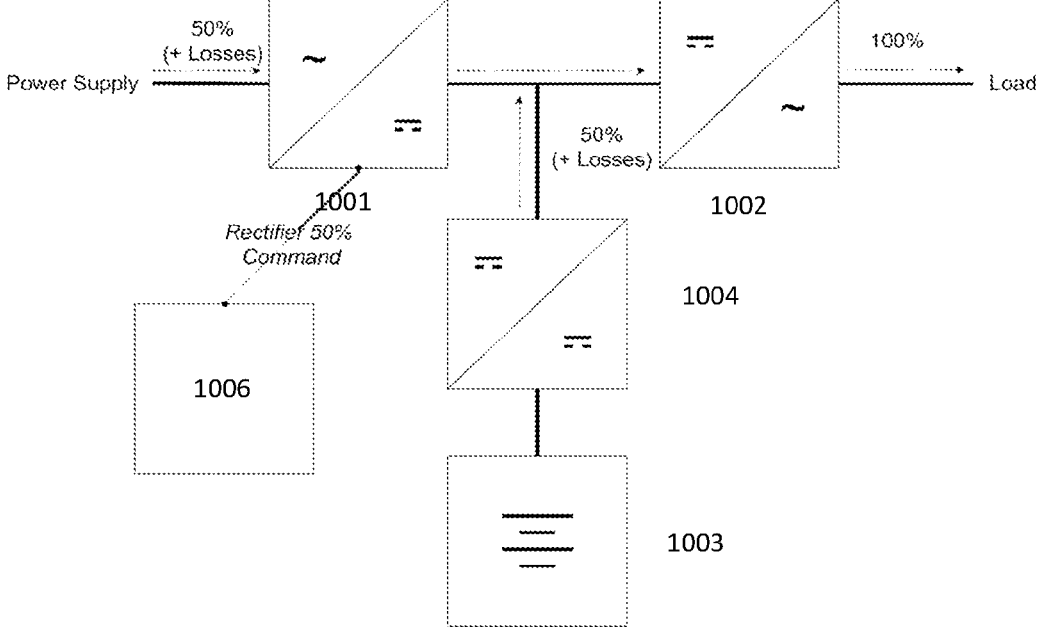
FIG. 7 represents a UPS+Peak-Shaving Discharging Operation, in accordance with the discharge stage of the current invention.

Now FIG. 7 represents a UPS+Peak-Shaving Discharging Operation in accordance with the present invention wherein the rectifier 1001 receives 50% of the total load from the power supply and sends information to the EMS 1006 which analyses the information and performs the claimed method in order to provide the inverter 1002 with the 50% missing load from the ESS 1003 and through the DC/DC Converter 1004, in order to supply the total load.

Figure 8:
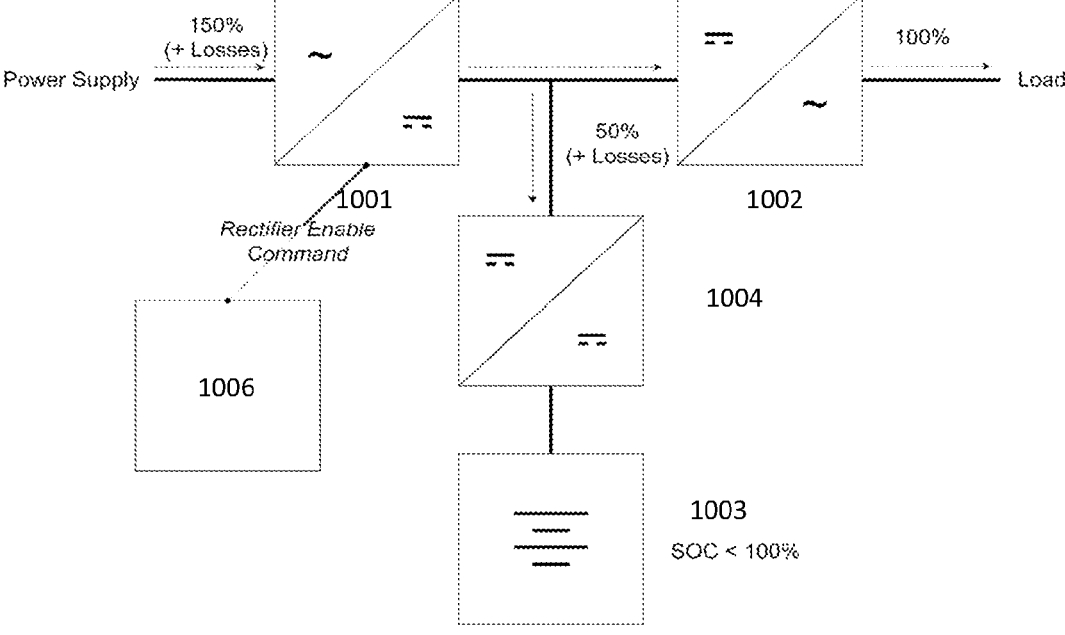
FIG. 8 represents a UPS+Peak-Shaving Recharge Operation in accordance with the recharge stage of the current invention.

Now, FIG. 8 represents UPS+Peak-Shaving Recharge Operation in accordance with the present invention wherein the EMS 1006 orders to the rectifier 1001 to accept a 150% of the load required in order to use the surplus 50% to recharge the BESS 1003, and to supply the total load.

Figure 9:
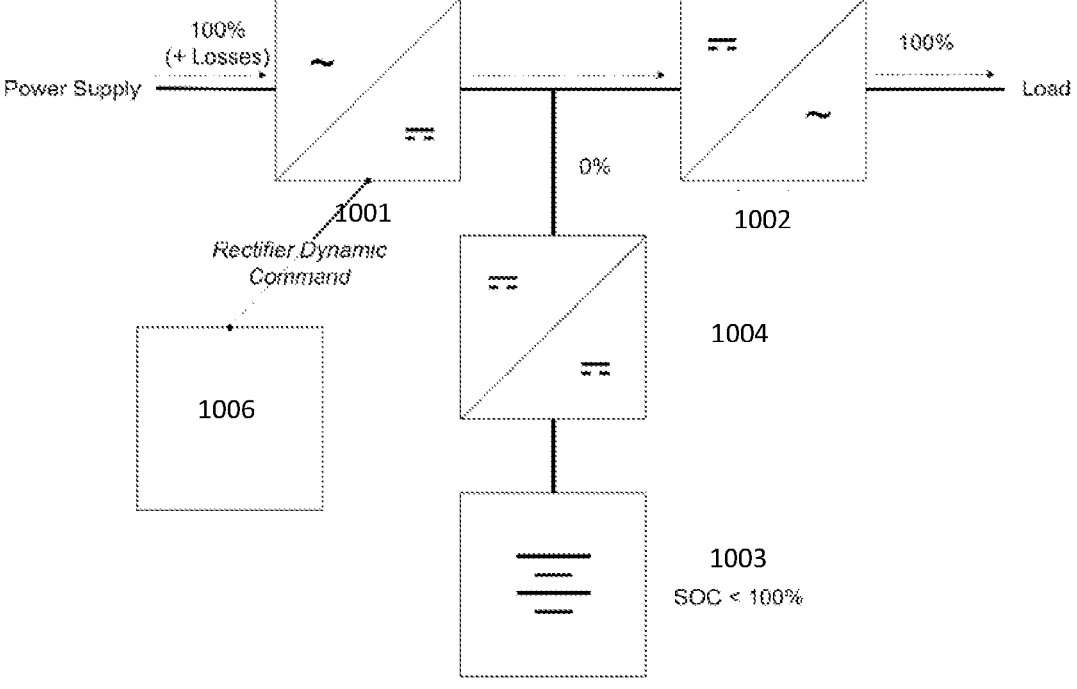
FIG. 9 represents a UPS+Peak-Shaving Stand-by Operation, in accordance with the stand-by stage of the current invention.

Referring now to FIG. 9, which represents an UPS+Peak-Shaving Stand-by Operation in accordance with the present invention wherein the EMS 1006 orders to the rectifier 1001 to accept a 100% of the total load required and to supply the total load without recharging or discharging the ESS 1003.

Figure 10:
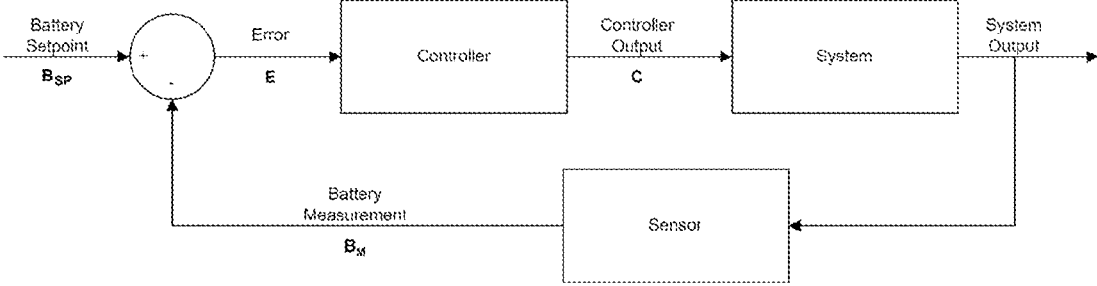
FIG. 10 represents a Closed-Loop Proportional Control System in accordance with the current invention.

Regarding FIG. 10, it represents how the error (E) between the expected battery output (Battery Setpoint—$B_{SP}$) and the actual battery output (Battery Measurement—$B_M$) is the input to the EMS 1006, where it is multiplied by a proportional gain factor ($K_P$) and added to the EMS 1006 output. This is the output of the EMS 1006 and input to the rectifier 1001.

The current invention will be better understood from the following examples, which are shown for illustrative purposes only to allow proper understanding of the preferred embodiments of the current invention, without implying that given that the other 50% will remain as backup in the event of a blackout. In addition, if the customer wants to double (factor 2) the battery life (related to SOH) the energy consumed from the batteries must be reduced. Thus, for the same case, energy savings are reduced by half with 0 hours of backup, but if the backup time is increased to 2 hours, the maximum energy that can be saved would be maintained at 50%.

Exemplary Data:
Typical guarantee: 4000 cycles to 75% SOH
A system maintains average customer load for 4 hours.
    With 0 Hrs. Guaranteed Backup Duration, it would mean a full discharge cycle.
    With 2 Hrs. Guaranteed Backup Duration, it would mean a 0.5 discharge cycle.
    With 4 Hrs. Guaranteed Backup Duration, it would mean a 0 discharge cycle.

TABLE 1

| | Peak-Shaving savings | | | | | | | | |
|---|---|---|---|---|---|---|---|---|---|
| Battery | Peak-Shaving savings Guaranteed Backup Duration (Hours) | | | | | | | | |
| Longevity (x) | 0 | 0.50 | 1.00 | 1.50 | 2.00 | 2.50 | 3.00 | 3.50 | 4.00 |
| 1 | 100% | 88% | 75% | 63% | 50% | 38% | 25% | 13% | 0% |
| 2 | 50% | 50% | 50% | 50% | 50% | 38% | 25% | 13% | 0% |
| 3 | 33% | 33% | 33% | 33% | 33% | 33% | 25% | 13% | 0% |
| 4 | 25% | 25% | 25% | 25% | 25% | 25% | 25% | 13% | 0% | there are no other embodiments non-illustrated which may be practiced based on the above disclosed detailed description.

Example 1

An example of operation of the invention is presented, showing how the system of the current invention considers the client's requirements when carrying out its operations. In the case of a Peak-Shaving event, the customer has the possibility to establish the amount of backup energy in hours (UPS mode) after the event. This parameter guarantees the continuous supply of energy in the event of a subsequent blackout. For this example, the ES is a lithium-based battery. However, the process of charging (100%) and discharging (0%) of the battery, known as a cycle, affects its useful life, since its maximum capacity decreases as its cycles increase. This gradual reduction of the state of health (SOH) can be controlled by the energy capacity that is demanded of it.

In Table 1, an example is shown wherein the battery has a rating of 4000 cycles to 75% SOH, this means that after 4000 cycles the maximum capacity of the battery will be 25% less than at the beginning. In each case, the proposed invention is designed to supply the amount of energy demanded by the customer. The client, for his part, can establish the backup time, which is inversely proportional to the amount of energy saved with Peak-Shaving; these factors also affect the longevity of the battery group.

Thus, for example, for factor 1 (battery longevity) and a backup duration of 0 hours, the claimed method will guarantee an approximate saving of 100% using all the energy stored in the ESS. As the client increases the duration of the backup time, the method will mitigate part of the energy consumption that exceeds the threshold (higher rate) but will seek to guarantee the time required by the client. Namely, if there is a backup time of 2 hours, it means that the system will be able to supply or save a maximum of 50% of energy, FIG. 4 shows the flow diagram for reading information, making decisions and responses through control signals.

Example 2

The example shows that in the event of a voltage drop on the grid, which can cause damage to equipment and halt production, the ESS instantly provides energy to the load to prevent power loss and interruption of operation (UPS mode). Furthermore, the double conversion guarantees superior power quality to the load.

Figure 11:
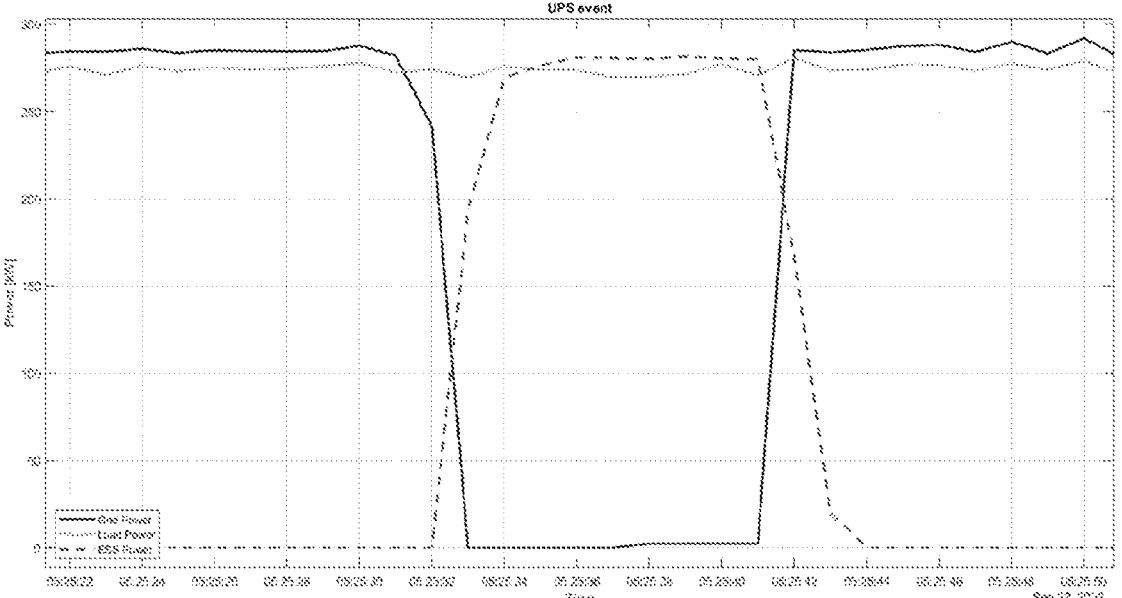
FIG. 11 corresponds to a power graphic that represents that as the grid power decreases, the ESS power increases to ensure that the load never loses power in accordance with the current invention.

In FIG. 11, when a blackout occurs, the UPS detects it via sensors in the rectifier and sends a control signal to this device to stop the power supply. Meanwhile, the inverter continues to supply power to the load, drawing current from the ESS as necessary. The figure illustrates that as the grid power decreases, the ESS's power increases to ensure that the load never loses power.

As shown in FIG. 11 and focusing on the load power, the system operates correctly maintaining a constant level even when there is a voltage drop from the grid.

Example 3

Figure 12:
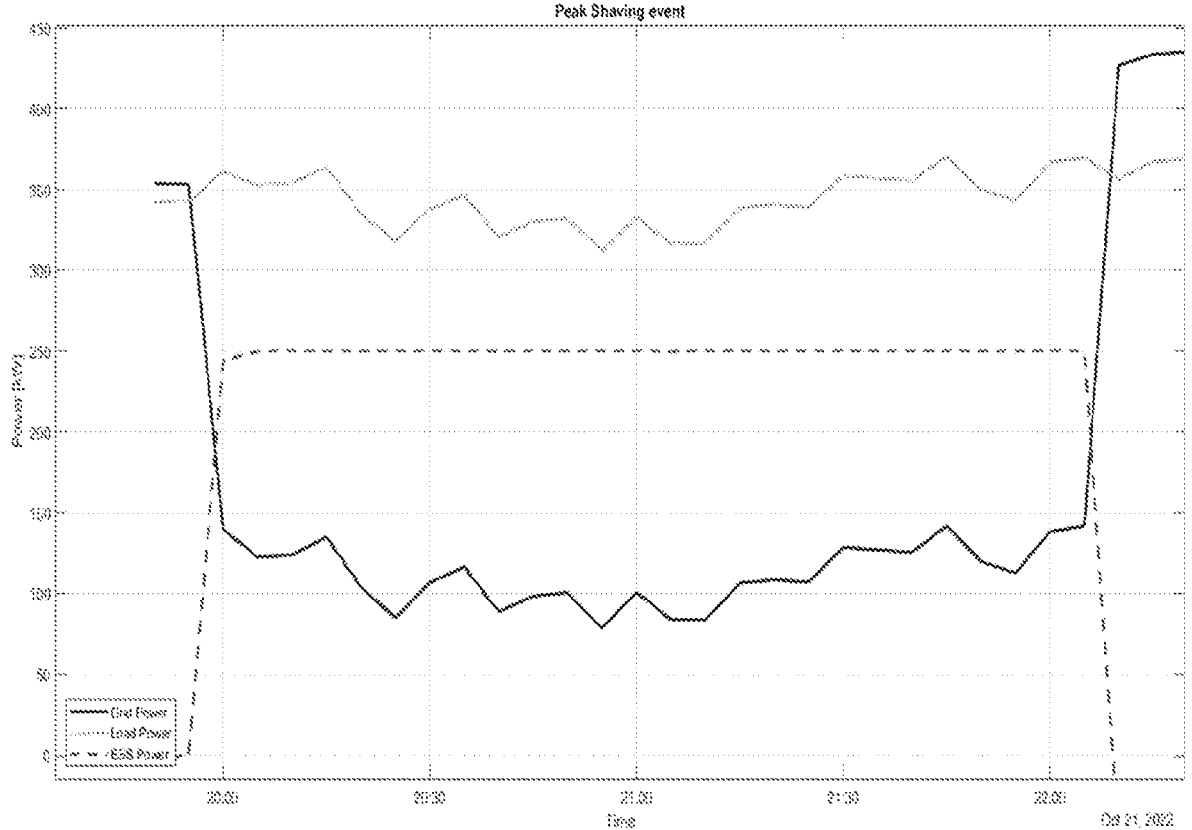
FIG. 12 corresponds to a power graphic that represents the operation in a Peak-Shaving Mode in accordance with the current invention.

The present invention can also operate in a Peak-Shaving mode, where it provides energy from the ESS to the load during times when electric rates are the highest. This helps to save on electricity bills by avoiding consuming power from the grid. FIG. 12 demonstrates this operation, wherein the period of high electricity prices is from 20:00 to 22:00. During this 2-hour period, the present invention consistently supplies energy from the ESS to the load, resulting in a drastic decrease in power consumption from the grid.

In this mode, the EMS reduces the consumption of the grid by sending a control signal to the rectifier and/or DC/DC converter, allowing the inverter to supply energy from the ESS to the load. However, the power required by the load remains constant, ensuring that the present invention operates correctly by reducing the power consumption of the network while maintaining the required power for the load.

However, notice that the grid power does not go to 0, the rectifier and/or DC/DC converter are dynamically controlled in real-time to maintain a certain power output from the ESS. This assures a certain level of savings while maintaining enough energy in the ESS for an outage.

In these two modes of operation the different stages of the present invention take place, the charging and recharging stages begin once the modes (UPS or Peak-Shaving) are finished. As mentioned, the discharge stage can be dynamically regulated, for example, 0% in case of a blackout in UPS mode or in a range 0-100% in Peak-Shaving as can be seen in FIG. 12, the percentage of consumption of the grid is approximately 35% of the nominal. Finally, the stand-by state works the rest of the day when there are no events and outside the high electric rate period. All these stages are controlled by the EMS that has a connection with all the elements of the present invention, in addition to its remote configuration mode that allows control of thresholds, periods, operating modes, etc. via a TCP/IP protocol.

Example 4

Figure 13:
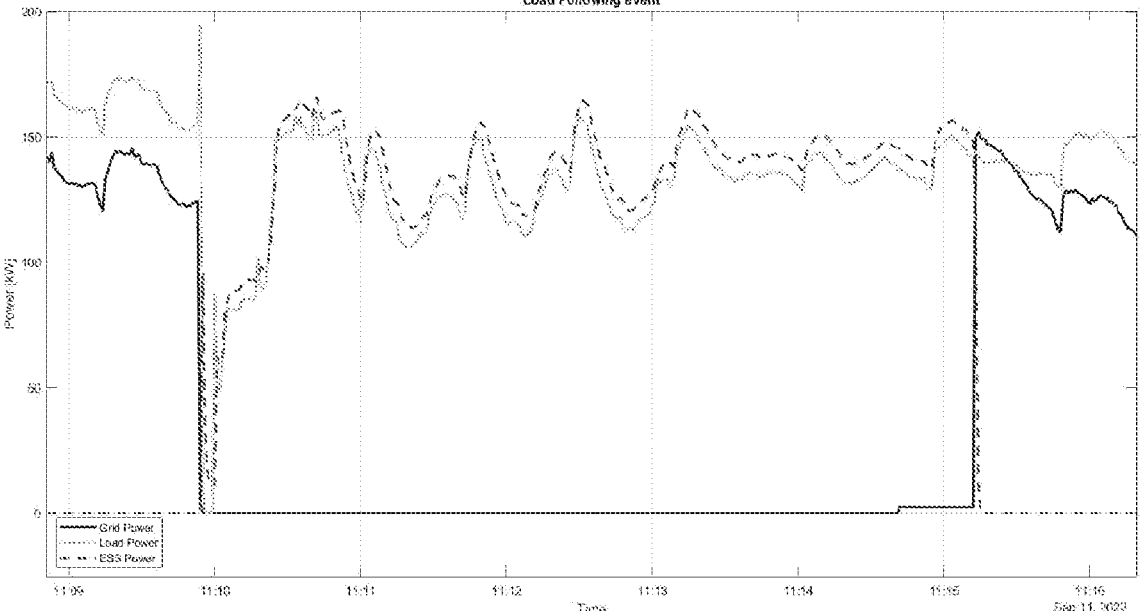
FIG. 13 corresponds to a power graphic that exemplifies the Load Following application of the current invention.
Figure 14:
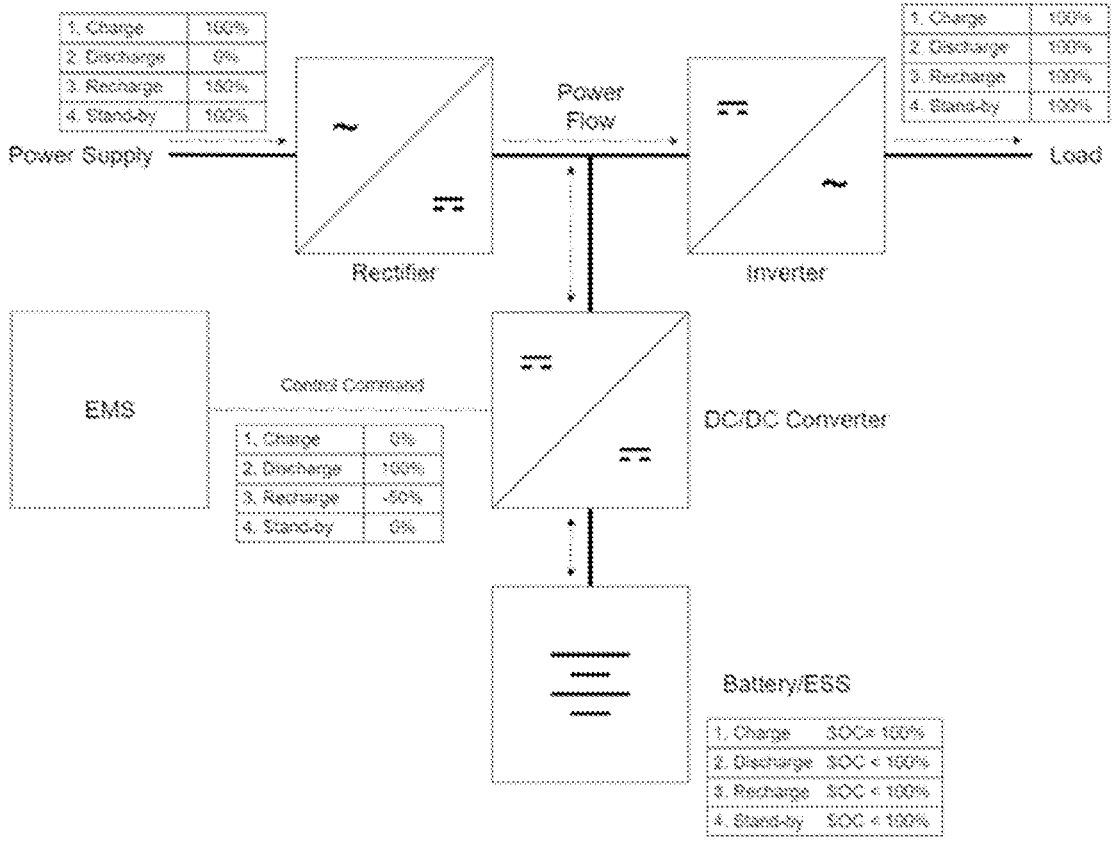
FIG. 14 represents a UPS+Peak-Shaving operation in which the conversion stages are performed in the rectifier and inverter and the control is performed in the DC/DC Converter.

Load Following, it is an additional application of the present invention wherein the setpoint of the rectifier and/or DC/DC converter can be dynamically varied to equalize the energy of the ESS with the consumption of the load. In FIG. 14 the DC/DC Converter control is illustrated. In FIG. 13 it can be seen that if the setpoint of the rectifier and/or DC/DC converter is dynamically varied, the power of the ESS supplies the power demand of the load, what is achieved with this sub mode of operation is to reduce the consumption of the grid to 0 KW, that is, the system reduces stress on the grid, which helps its stability and can reduce electricity costs to the consumer. Furthermore, this type of dynamic setpoint operation can be used to provide ancillary services to the grid, such as frequency regulation or demand response, by injecting or absorbing energy into the battery given a frequency or utility signal. This can provide an additional source of revenue for this sort of system.

After the UPS and Peak-Shaving modes are finished, the recharging stages begin. The discharge stage can be dynamically regulated, for example, 100% in UPS mode or 0-100% in Peak-Shaving as seen in FIG. 12, where the consumption of grid power is approximately 35% of the nominal. The stand-by state operates the rest of the day when there are no events and outside of the high electricity rate period. All these stages are controlled by the EMS, which has a connection with all the elements of the invention and can be remotely configured to control thresholds, periods, operating modes, etc. via a TCP/IP protocol.

As can be seen from above, the invention features a Load-Following capability, allowing the rectifier's setpoint to adjust dynamically to match the energy coming from the ESS with the energy consumed by the load. This helps to lower the grid demand to zero when the system has enough capacity, such as during Peak-Shaving mode when the load demand falls below the setpoint. As shown in FIG. 13, by dynamically adjusting the rectifier's setpoint, the ESS can provide the energy required by the load, thereby reducing the need for grid power to 0 kilowatts.

Example 5

ESS as a power source. Within this application of the present invention, depicted in FIG. 15 the AC/DC conversion and DC/AC conversion stages are PCSs enabling bidirectional power flow. In this variation, the control can be of the PCSs only, or in addition to the DC/DC Converter. In the context of ancillary services wherein the ESS can be used to improve the quality of the public grid, the present invention has the capability to discharge energy from the ESS to the public grid. In other words, instead of consuming energy, the ESS acts as a power source, which can mitigate frequency regulation issues, voltage regulation, power backup for critical areas, peak demand management, and fast response services. In markets where there are benefits and compensation for providing stability and reliability to the electrical grid, the present invention offers a way to monetize a system from two fronts.

It is to be understood that the description of the foregoing exemplary embodiments is intended to be only illustrative, rather than exhaustive, of the current invention. Those of ordinary skill will be able to make certain additions, deletions, and/or modifications to the embodiments of the disclosed subject matter without departing from the spirit of the invention or its scope, as defined by the appended claims.

The invention claimed is:

1. An uninterruptible power supply (UPS) system with Peak-Shaving and energy time shifting functions comprising:

at least one UPS comprising a rectifier, an inverter, and at least one Energy Storage System (ESS);

an Energy Management System (EMS) configured to control the system upon detection of predetermined power quality events, changed electricity rates, or power demand or capacity charges;

at least one processor; and at least one non-transitory computer readable media comprising software, wherein the software causes the at least one processor to configure the system to operate according to operating stages comprising:

a charge stage, wherein the system is configured to (i) power a load by a power source and (ii) keep the at least one ESS fully charged, wherein the configuration provides a back-to-back UPS operation;

a discharge stage, wherein the system is configured to (i) reduce or prevent drawing power from the power source and (ii) draw power from the at least one ESS;

a bidirectional stage, wherein the system is configured to discharge energy to a state of charge (SOC) from the at least one ESS to the power source;

a recharge stage, wherein the system is configured to (i) control charging of the at least one ESS, wherein the controlling is based on a demand or a state of charge (SOC) thereof and (ii) maintain the at least one ESS upon an established threshold; and a stand-by stage, wherein the system is configured to (i) draw an amount of current from the power source that is exactly equal to an amount of current needed by the load and (ii) prevent charge or discharge of the at least one ESS.

2. The system of claim 1, wherein the at least one ESS comprises a respective DC/DC converter.

3. The system of claim 2, wherein, in the discharge stage, the system is configured to reducer or prevent drawing power from the power source and draw power from the at least one ESS by limiting the rectifier or controlling the DC/DC converter.

4. The system of claim 1, wherein the system is further configured with a double-conversion configuration.

5. The system of claim 1, wherein the EMS is connected directly to the rectifier using a dedicated communication port.

6. The system of claim 2, wherein the EMS is configured with an appropriate schedule or an algorithm to control the rectifier, the DC/DC converter, or both, by receiving a control signal to limit power drawn from the power source.

7. The system of claim 6, wherein the control signal is sent by a closed-loop control algorithm to adjust the control signal based on a desired ESS power output and a dynamic load power.

8. The system of claim 1, wherein the EMS is further configured to maintain communication with other elements of the system using industrial communication protocols for monitoring a status of each other element and controlling each other element, wherein the monitoring and controlling avoids overloads or excessive discharges of the at least one ESS and assures safe and optimal operation of each elements.

9. The system of claim 1, wherein the power source comprises a grid or a renewable energy (RE).

10. The system of claim 1, wherein the at least one ESS comprises a total capacity divided into racks, wherein each rack comprises battery modules connected in series, and wherein each battery module, comprises cells connected in series.

11. A method for operating an uninterruptible power supply (UPS) system with Peak-Shaving and energy time shifting functions, the method comprising, upon detection of predetermined power quality events, changed electricity rates, or power demand or capacity charges:

(a) configuring the system to a charge stage by (i) powering a load by a power source and (ii) keeping at least one energy storage system (ESS) fully charged, wherein the configuring in (a) provides a back-to-back UPS operation;

(b) configuring the system to a discharge stage by (i) reducing or preventing power drawn from the power source and (ii) drawing power from the at least one ESS;

(c) configuring the system to a bidirectional stage by discharging energy to a state of charge (SOC) from the at least one ESS to the power source;

(d) configuring the system to a recharge stage by (i) controlling charging of the at least one ESS, wherein the controlling is based on a demand or a state of charge (SOC) thereof and (ii) maintaining the at least one ESS upon an established threshold; and (e) configuring the system to a stand-by stage by (i) drawing an amount of current from the power source that is exactly equal to an amount of current needed by the load and (ii) preventing charge or discharge of the at least one ESS.

12. The method of claim 11, further comprising configuring the system to stay pending power quality events to generate an immediate response.

13. The method of claim 12, further comprising configuring the system to filter power variations from the power source to the load.

14. The method of claim 11, further comprising, at the discharge stage, using an online inverter to draw current from the at least one ESS to the load, wherein the load sees no disturbance when transitioning to the discharge stage.

15. The method of claim 11, further comprising, at the discharge stage, shutting off a rectifier to achieve a power draw of 0%-100%, wherein the shutting off occurs directly or by simulating an outage through an external breaker.

16. The method of claim 11, further comprising, at the recharge stage, supplying 100% of the load and any current to the at least one ESS at a preset charging rate with a rectifier, wherein the supplying is based on a maximum ratings of the rectifier or a limitation of the power supply.

17. The method of claim 11, further comprising, at the recharge stage, controlling a rectifier to stop power inflow to the at least one ESS when a maximum cell voltage of a rack of the at least one ESS reaches a maximum allowable level.

18. The method of claim 11, wherein a rectifier of the UPS receives an input signal comprising a power setpoint that limits a throughput of the rectifier.

19. The method of claim 18, wherein the throughput is restricted from 0%-100% of a capacity of the rectifier by an electrical signal.

20. A non-transitory computer readable media that comprises a software or executable instructions to operate an uninterruptible power supply (UPS) system with Peak-Shaving and energy time shifting functions, the instructions comprising, upon detection of predetermined power quality events, changed electricity rates, or power demand or capacity charges:

(a) configuring the system to a charge stage by (i) powering a load by a power source and (ii) keeping at least one energy storage system (ESS) fully charged, wherein the configuring in (a) provides a back-to-back UPS operation;

(b) configuring the system to a discharge stage by (i) reducing or preventing power drawn from the power source and (ii) drawing power from the at least one ESS;

(c) configuring the system to a bidirectional stage by discharging energy to a state of charge (SOC) from the at least one ESS to the power source;

(d) configuring the system to a recharge stage by (i) controlling a charging current to the at least one ESS, wherein the controlling is based on a demand or a state of charge (SOC) thereof and (ii) maintaining the at least one ESS upon an established threshold; and (e) configuring the system to a stand-by stage by (i) drawing an amount of current from the power source that is exactly equal to an amount of current needed by the load and (ii) preventing charging or discharging of the at least one ESS.

21. An uninterruptible power supply (UPS) system with Peak-Shaving and energy time shifting functions, the system comprising:

at least one UPS comprising at least one Power Conversion System (PCS) and at least one Energy Storage System (ESS);

an Energy Management System (EMS) configured to control the system upon detection of predetermined power quality events, changed electricity rates, or power demand or capacity charges;

at least one processor; and at least one non-transitory computer readable media comprising software, wherein the software causes the processor to configure the system to operate according to operating stages comprising:

a charge stage, wherein the system is configured to (i) power a load by a power source and (ii) keep the at least one ESS fully charged, wherein the configuration provides a back-to-back UPS operation;

a discharge stage, wherein the system is configured to (i) reduce or prevent drawing power from the power source and (ii) draw power from the at least one ESS;

a bidirectional stage, wherein the system is configured to discharge energy to a state of charge (SOC) from the at least one ESS to the power source;

a recharge stage, wherein the system is configured to (i) control charging of the at least one ESS, wherein the controlling is based on a demand or a state of charge (SOC) thereof and (ii) maintain the at least one ESS upon an established threshold, wherein the configuration is obtained by enabling the at least one PCS to 0%-100%; and a stand-by stage, wherein the system is configured to (i) draw an amount of current from the power source that is exactly equal to an amount of current needed by the load and (ii) prevent charge or discharge of the at least one ESS, wherein the configuration is obtained by commanding the at least one PCS in real-time.

22. The system of claim 21, wherein the system responds to the predetermined power quality events, the changed electricity rates, or the power demand or capacity charges by controlling the at least one PCS.

23. The system of claim 21, wherein, in the discharge stage, the system is configured to reduce or prevent drawing power from the power source and draw power from the at least one ESS by limiting the at least one PCS.

24. The system of claim 21, wherein, in the stand-by stage, the system is configured to draw the amount of current from the power source exactly equal to the amount of current needed by the load by controlling the at least one PCS.

25. The system of claim 21, wherein the EMS is connected directly to the at least one PCS using a dedicated communication port.

26. The system of claim 21, wherein the EMS is configured with an appropriate schedule or an algorithm to control the at least one PCS to limit power drawn from the power source.

27. The system of claim 1, wherein the state of charge (SOC) is dynamically regulated between 0%-100%.

28. The system of claim 1, wherein the predetermined power quality events, the electricity changed rates, or the power demand or capacity charges comprise events associated with frequency regulation issues, voltage regulation, power backup for critical areas, peak demand management, and fast response services.

29. The system of claim 1, wherein the EMS uses the Peak-Shaving function to determine a desired state of charge (SOC) of the least one ESS based at least on a state of health (SOH) of the at least one ESS.

30. The system of claim 1, wherein the EMS uses the energy time shifting function to determine a desired state of charge (SOC) of the least one ESS based at least on real-time electricity demand, electricity rates, or time-of-use (TOU) rates.

31. The system of claim 1, wherein, in the bidirectional stage, the system is configured to dynamically regulate discharge of the energy from the at least one ESS to a minimum allowable level or a state of charge (SOC).

32. The system of claim 1, wherein the system is configured to continuously condition the power from the power source by flowing the power from the power source through the rectifier and the inverter to the load.

33. The system of claim 32, wherein the system is configured without a bypass for flowing the power from the power source directly to the load.

34. The system of claim 1, further comprising a first power conversion system (PCS) comprising the rectifier and a second PCS comprising the inverter, wherein control of the first PCS and the second PCS collectively operates the system according to the operating stages.

* * * * *